(12) United States Patent
Moris (10) Patent No.: US 10,240,632 B2
(45) Date of Patent: Mar. 26, 2019

(54) DRAWER GUIDE SYSTEM

(71) Applicant: HANDY BUTTON MACHINE CO., Wheeling, IL (US)

(72) Inventor: Robert A. Moris, New Lenox, IL (US)

(73) Assignee: HANDY BUTTON MACHINE CO., Wheeling, IN (US)

( * ) Notice: Subject to any disclaimer, the term of this patent is extended or adjusted under 35 U.S.C. 154(b) by 194 days.

(21) Appl. No.: 15/226,618

(22) Filed: Aug. 2, 2016

(65) Prior Publication Data

US 2017/0035199 A1 Feb. 9, 2017

Related U.S. Application Data (60) Provisional application No. 62/201,967, filed on Aug. 6, 2015.

(51) Int. Cl.
*F16C 29/00* (2006.01)
*A47B 88/427* (2017.01)
*F16C 29/02* (2006.01)

(52) U.S. Cl.
CPC .......... *F16C 29/005* (2013.01); *A47B 88/427* (2017.01); *F16C 29/02* (2013.01); *A47B 2088/4276* (2017.01); *A47B 2088/4278* (2017.01); *A47B 2210/0005* (2013.01); *A47B 2210/0056* (2013.01); *F16C 2314/72* (2013.01)

(58) Field of Classification Search
CPC .... F16C 29/005; F16C 29/02; F16C 2314/72; A47B 88/427; A47B 2088/4276; A47B 2088/4278; A47B 2210/0005; A47B 2210/0056; A47B 88/42; A47B 88/421; A47B 88/422; A47B 88/423; A47B 88/4235; A47B 88/4276; A47B 88/4278
See application file for complete search history.

(56) References Cited

U.S. PATENT DOCUMENTS

| | | | | |
|---|---|---|---|---|
| 3,201,187 A | * | 8/1965 | Hahn | A47B 88/483 312/334.34 |
| 4,427,246 A | * | 1/1984 | MacDonald | A47B 88/487 312/334.43 |
| 4,534,600 A | * | 8/1985 | Cosme | A47B 88/483 384/23 |
| RE32,134 E | * | 5/1986 | Gutner | A47B 88/483 384/19 |
| 4,778,230 A | * | 10/1988 | Lautenschlager | A47B 88/427 312/334.5 |
| 5,131,733 A | * | 7/1992 | Lautenschlager | A47B 88/427 312/334.38 |

(Continued)

*Primary Examiner* — Hanh V Tran
(74) *Attorney, Agent, or Firm* — Marshall, Gerstein & Borun LLP (57) ABSTRACT

A drawer guide system for a drawer. The drawer guide system includes a drawer guide and a case runner having an outwardly extending flange disposed within an elongate recess of the drawer guide. The drawer guide system further includes a center-mounted bracket to be secured to a rear end of a drawer and a center-mounted release mechanism to be secured to a front end of the drawer that is aligned with the rear end. Upon insertion of the case runner and drawer guide into a recess of the bracket, a tab of the release mechanism engages a window of a side wall of the drawer guide and a locking tang of the drawer guide engages an aperture of the bracket to lock the drawer guide to the drawer.

17 Claims, 9 Drawing Sheets

(56) References Cited

U.S. PATENT DOCUMENTS

| | | | | |
|---|---|---|---|---|
| 5,242,221 A * | 9/1993 | Rotthowe | A47B 88/487 | 312/334.38 |
| 5,439,283 A * | 8/1995 | Schroder | A47B 88/407 | 312/334.38 |
| 5,588,729 A * | 12/1996 | Berger | A47B 88/427 | 312/330.1 |
| 5,775,787 A * | 7/1998 | Gasser | A47B 88/493 | 312/333 |
| 6,485,120 B1 * | 11/2002 | Pomerleau | A47B 88/427 | 312/334.27 |
| 6,837,557 B2 * | 1/2005 | Domenig | A47B 88/487 | 312/334.27 |
| 8,056,994 B2 * | 11/2011 | Chen | A47B 88/427 | 312/334.14 |
| 8,220,884 B2 * | 7/2012 | Berger | A47B 88/427 | 312/334.4 |
| 2003/0205955 A1 * | 11/2003 | Egger | A47B 88/43 | 312/334.5 |
| 2003/0234603 A1 * | 12/2003 | Salice | A47B 88/407 | 312/334.5 |
| 2004/0095047 A1 * | 5/2004 | Salice | A47B 88/427 | 312/332.1 |
| 2009/0236959 A1 * | 9/2009 | Liang | A47B 88/427 | 312/334.4 |
| 2009/0261700 A1 * | 10/2009 | Chen | A47B 88/427 | 312/334.46 |
| 2013/0249366 A1 * | 9/2013 | Gasser | A47B 88/16 | 312/333 |
| 2013/0257244 A1 * | 10/2013 | Salice | A47B 88/0418 | 312/319.1 |
| 2014/0055020 A1 * | 2/2014 | Gasser | A47B 88/16 | 312/333 |
| 2014/0265791 A1 * | 9/2014 | Hunter | A47B 88/16 | 312/334.12 |

* cited by examiner

DRAWER GUIDE SYSTEM

REFERENCE TO RELATED APPLICATION

This application claims the benefit of the filing date of U.S. Provisional Patent Application No. 62/201,967, filed Aug. 6, 2015. The entire disclosure of U.S. Provisional Patent Application No. 62/201,967 is hereby incorporated by reference.

FIELD OF THE DISCLOSURE

This disclosure relates generally to drawer assemblies, and, more particularly, to an improved drawer guide system and method of assembly.

BACKGROUND OF THE DISCLOSURE

Figure 1:
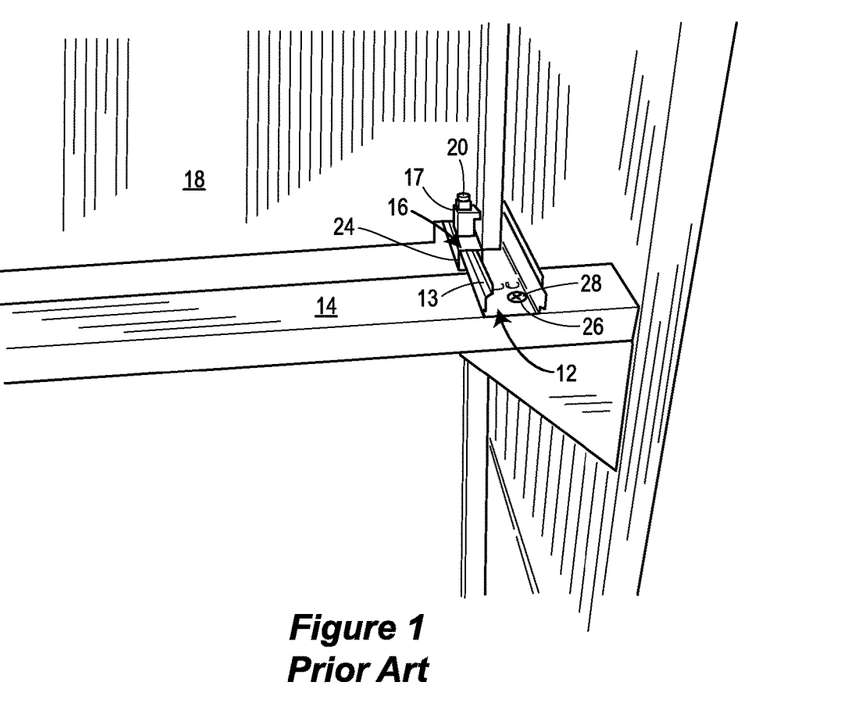
FIG. 1 is a perspective view of a conventional drawer guide assembly secured to a drawer.

Many furniture manufacturers use metal drawer guide assemblies having an elongate stationary lower metal drawer guide. Referring now to FIG. 1, and in one conventional example, a metal case runner 12 is secured to an inside structure of a furniture article 14. An elongate upper metal drawer guide 16 is secured to a bottom surface of a drawer 18 at a front end (not shown) and a rear end of the drawer 18, for example. As in many conventional drawer guide assemblies, the lower metal case runner 12 includes a generally U-shaped (or T-shaped) metal rail (in cross-section), having one or more members 13 projecting horizontally outwardly from upper ends of the U-shape, for example. The upper metal drawer guide 16 is generally C-shaped in cross-section and may have an integral, upwardly-extending metal tab member 17 at the rear end that is secured to a rear wall of the drawer 18.

More specifically, to secure the metal drawer guide 16 to the bottom of the drawer 18, a hole 20 is typically first milled in the back or rear end of the drawer 18, as depicted in FIG. 1. The tab member 17 of the drawer guide 16 is received in the hole 20 to help secure the drawer guide 16 to the drawer 18. The outwardly extending member 13 of the case runner 12 is then disposed within a recess 24 of the drawer guide 16 to secure the case runner 12 to the drawer guide 16, for example. In addition, the rear end of the case runner 12 includes an aperture 26 for receiving an attachment mechanism 28, such as a screw, to secure the case runner 12 to the rear portion of furniture 14.

However, having to mill the hole 20 at the rear end of the drawer 18 is typically time consuming and often results in variations in the size and location of the hole 20, making the assembly process less efficient. In addition, because of variations in milling the hole 20, for example, the metal tab member 17 does not always fit into the hole 20, making proper securement of the drawer guide 16 to the drawer 18 difficult. Thus, for at least these reasons, it is desired to provide an improved design for securing a drawer guide to a drawer, for example, and a more efficient process of assembling a drawer guide system to a drawer.

SUMMARY OF THE DISCLOSURE

The present disclosure is directed to a drawer guide system. The drawer guide system includes a drawer guide having a front end, a rear end, a top portion, a pair of side walls attached to the top portion, and an inwardly extending flange attached to one side wall of the pair of side walls and extending from the front end to the rear end. An elongate recess is disposed between the top portion and the pair of side walls, and a window is disposed on one side wall of the pair of side walls near the front end. The drawer guide further includes a locking tang disposed on the top portion near the rear end.

The drawer guide system further includes a case runner having a front end, a rear end, a base, one side wall attached to the base and an outwardly extending flange attached to the side wall and extending from the front end to the rear end. The outwardly extending flange is disposed within the elongated recess of the drawer guide along a length of the case runner forming a slide assembly.

The drawer guide system also includes a bracket secured to a center of a rear portion of a drawer, the bracket having a front end, a rear end, a top portion, and a pair of side walls attached to the top portion. An elongate recess is disposed between the pair of side walls and extends from the front end to the rear end, and a projection upwardly extends from the top portion at the rear end. The projection includes an aperture for receiving the locking tang of the drawer guide upon insertion of the slide assembly into the elongate recess of the bracket.

The drawer guide system still further includes a release mechanism secured to a center of a front portion of the drawer. The release mechanism has a front end, a rear end, and a pair of fins outwardly extending from the front end to the rear end. Each fin of the pair of fins has an inside surface, and a first tab is disposed on the inside surface of one fin of the pair of fins. A second tab is disposed on the front end of the release mechanism. The first tab of the release mechanism engages the window of the side wall of the drawer guide, and the second tab contacts the inwardly extending flange of the drawer guide, stabilizing the engagement between the first tab of the release mechanism and the window of the drawer guide. The locking tang of the drawer guide engages the receiving aperture of the bracket to lock the drawer guide to the drawer.

In another example of the present disclosure, a release mechanism for a drawer guide system includes a front end to be secured to an inside surface of a front end of a drawer, a rear end, and a pair of fins extending from the front end to the rear end. Each fin of the pair of fins has an outside surface and an inside surface. A first tab is disposed on the inside surface of one fin, and the first tab engages a window of a drawer guide to secure the drawer guide to the front portion of the drawer. In addition, a second tab is disposed on the front end, and the second tab contacts an inwardly extending flange of the drawer guide to help stabilize engagement between the first tab and the window of the drawer guide.

In yet another example of the present disclosure, a method of assembling a drawer guide system to a drawer includes securing a bracket to a center of an outside rear portion of a drawer, the bracket having a front end, a rear end, a top portion, a projection extending from the top portion at the rear end, and an aperture disposed in the projection. The method further includes securing a release mechanism to a center of an inside front portion of the drawer, the release mechanism having a pair of fins extending from a front end to a rear end of the release mechanism, one fin from the pair of fins having a tab. The method also includes disposing a portion of a case runner within an elongate recess of a drawer guide along the length of the drawer guide, forming a slide assembly, and inserting a front end of the slide assembly into the recess of the bracket at the rear end of the bracket. Still further, the method includes engaging the tab of the release mechanism with a window of a side wall of the drawer guide, and inserting a locking tang of the drawer guide into the aperture of the bracket to lock the drawer guide to the drawer.

DETAILED DESCRIPTION OF THE DISCLOSURE

Generally, a drawer guide system for a drawer is disclosed. The drawer guide system includes a drawer guide and a case runner partially disposed within the drawer guide to form a slide assembly. The drawer guide system further includes a center-mounted bracket and a center-mounted release mechanism. The bracket is secured to an outside surface of a center rear end of a drawer, and the release mechanism is secured to an inside surface of a center front end of the drawer. The slide assembly is inserted into a recess of the bracket at a rear end of the bracket until a window of the drawer guide engages a tab of the release mechanism and a locking tang of the drawer guide engages a receiving aperture of the bracket, thereby securing and locking the drawer guide to the drawer.

Figure 2:
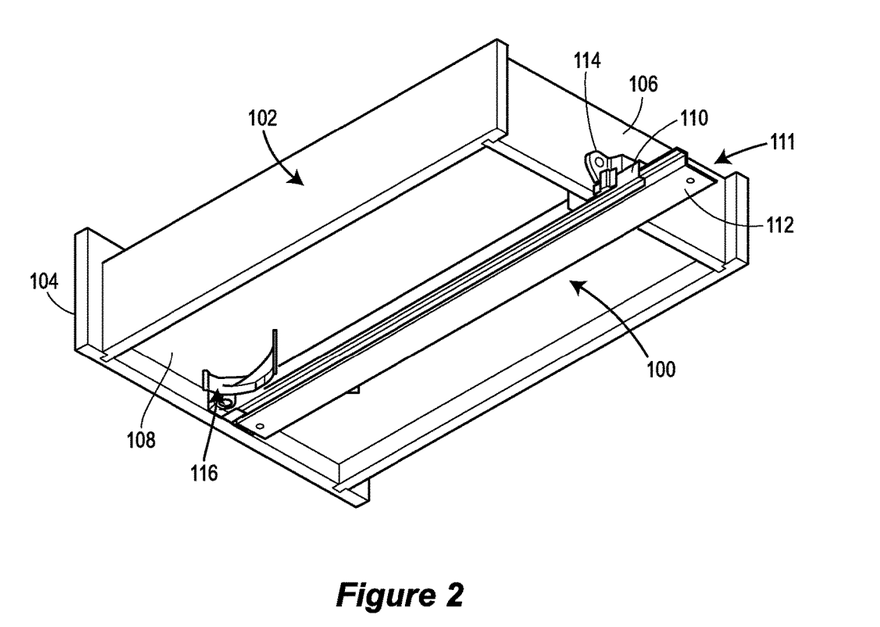
FIG. 2 is a perspective view of a drawer guide system of the present disclosure.

More specifically, and as depicted in FIG. 2, a drawer guide system 100 of the present disclosure is secured to a drawer 102. The drawer 102 includes a front end 104, a rear end 106 and a bottom surface 108. The drawer guide system 100 also includes a drawer guide 110 and a case runner 112 partially disposed within the drawer guide 110 to form a slide assembly 111. A bracket 114 is secured to a center of an outside surface of the rear end 106 of the drawer 102 and receives the slide assembly 111 at a rear end, as explained in more detail below. A release mechanism 116 is secured to a center of an inside surface of the front end 104 of the drawer 102 and receives a front end of the slide assembly 111, as depicted in FIG. 2. Because both the bracket 114 and the release mechanism 116 are center-mounted, there is no need for two brackets and/or two release mechanisms to accommodate two case runners, for example.

Figure 3:
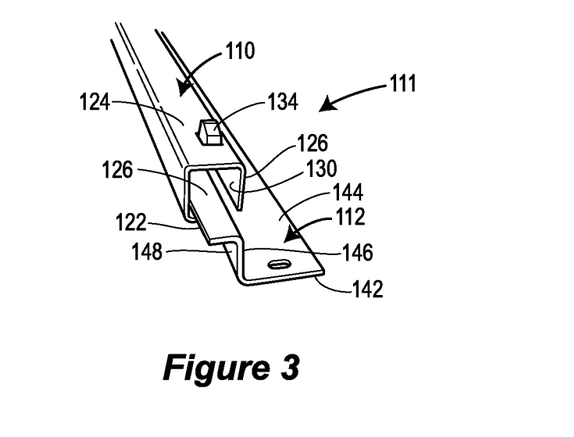
FIG. 3 is a rear perspective view of a case runner and a drawer guide of the drawer guide system of the present disclosure.
Figure 4:
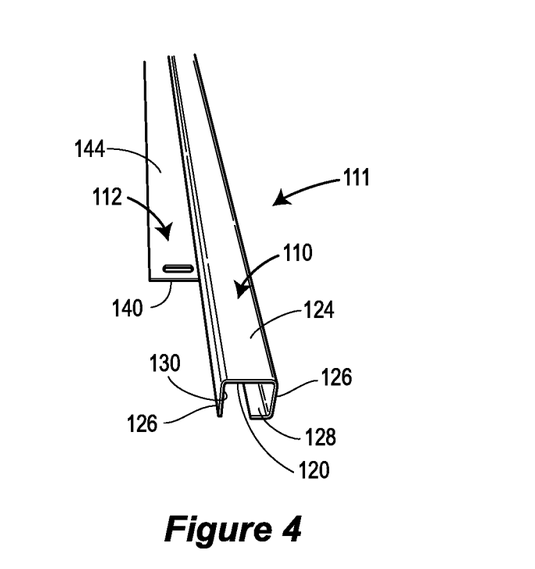
FIG. 4 is front perspective view of the case runner and the drawer guide of the drawer guide system of the present disclosure.

Referring now to FIGS. 3 and 4, a rear perspective view and a front perspective view, respectively, of the slide assembly 111 are depicted. As noted, the slide assembly 111 includes the drawer guide 110 and the case runner 112. The drawer guide 110 includes a front end 120 (FIG. 4), a rear end 122, a top portion 124, and a pair of side walls 126 attached to the top portion 124. An inwardly extending flange 128 (FIG. 4) is attached to one side wall 126 of the pair of side walls 126. An elongate recess 130 is disposed between the top portion 124 and the pair of side walls 126. A window 132 (FIG. 5A) is disposed on an outside surface of one side wall 126 of the pair of side walls 126 near the front end 120 of the drawer guide 110. A locking tang 134 is disposed on the top portion 124 of the drawer guide 110 near the rear end 122 of the drawer guide 110.

The case runner 112 includes a front end 140, a rear end 142, a base 144, and one side wall 146 attached to the base 144. An outwardly extending flange 148 is attached to the side wall 146 and extends from the front end 140 to the rear end 142 of the case runner 112. As depicted, for example, in FIG. 3, the outwardly extending flange 148 of the case runner 112 is disposed within the elongate recess 130 of the drawer guide 110 along the length of the drawer guide 110 to form the slide assembly 111.

Figure 5A:
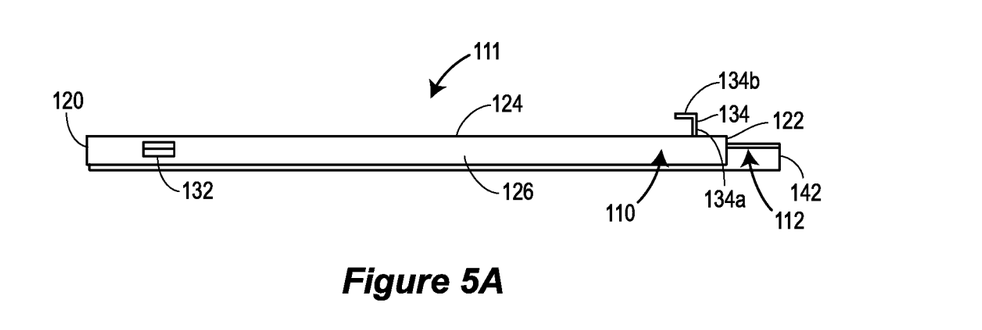
FIG. 5A is a side view of the case runner and the drawer guide of the drawer guide system of the present disclosure.
Figure 5B:
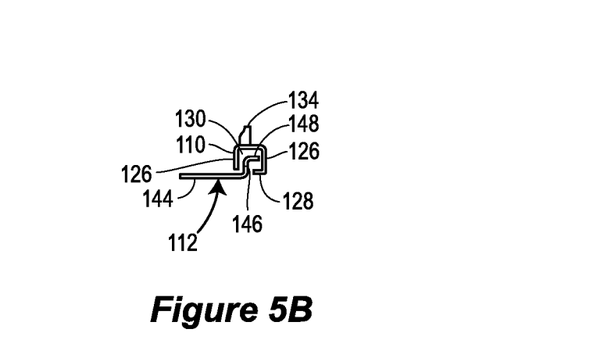
FIG. 5B is a front view of the case runner and the drawer guide of the drawer guide system of the present disclosure.
Figure 6:
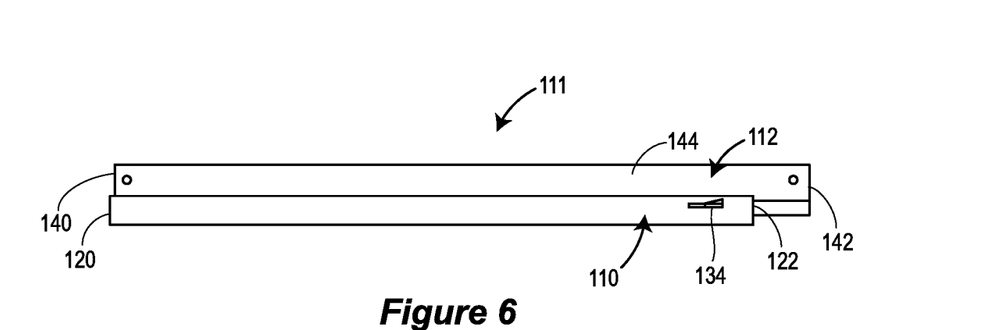
FIG. 6 is a top view of the case runner and the drawer guide of the drawer guide system of the present disclosure.

Referring now to FIGS. 5A, 5B and 6, the locking tang 134 of the drawer guide 110 is L-shaped and includes a vertical base 134a and a horizontal flange 134b outwardly extending from the base 134a, as depicted in FIG. 5A, for example.

Further, and as depicted in FIG. 5B, the outwardly extending flange 148 of the case runner 112 is trapped within the recess 130 of the drawer guide 110 by at least the inwardly extending flange 128 of the drawer guide 110. Said another way, upon insertion of the outwardly extending flange 148 of the case runner 112 into the elongate recess 130 of the drawer guide 110, the outwardly extending flange 148 is disposed above and adjacent to the inwardly extending flange 128 of the drawer guide 110. As a result, the inwardly extending flange 128 prevents the outwardly extending flange 148 from inadvertently separating from the drawer guide 110. In other words, the inwardly extending flange 128 of the drawer guide 110 essentially traps the outwardly extending flange 148 of the case runner 112 within the recess 130 of the drawer guide 110, preventing inadvertent removal of the case runner 112 from the drawer guide 110.

Figures 7, 8, 9:
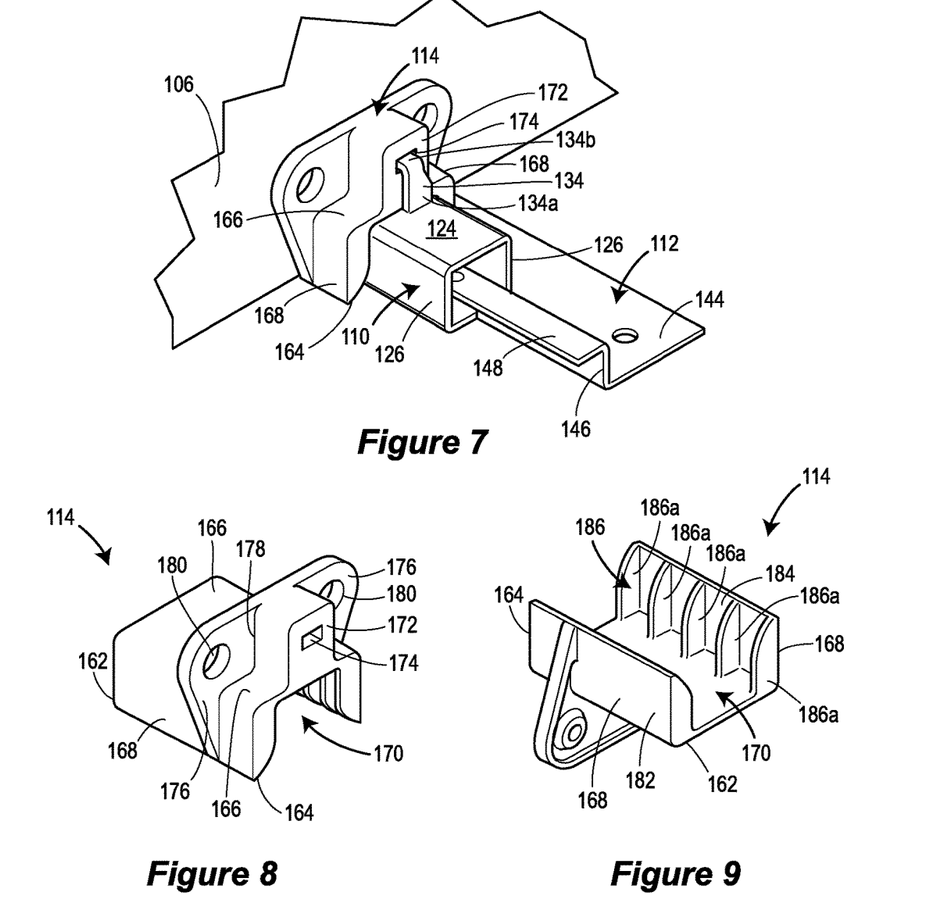
FIG. 7 is a rear perspective view of a bracket of the drawer guide system of present disclosure secured to a rear end of a drawer and having the case runner and drawer guide of the drawer guide system disposed within the bracket.
FIG. 8 is a rear perspective view of the bracket of the drawer guide system of the present disclosure.
FIG. 9 is a bottom perspective view of the bracket of the drawer guide system of the present disclosure.

Referring now to FIG. 7, a rear view of a bracket 114 of the drawer guide system 100 secured to an outside surface of the rear end 106 of the drawer 102 is depicted. The bracket 114 includes a front end 162, a rear end 164, a top portion 166, and a pair of side walls 168 attached to the top portion 166. An elongate recess 170 (FIGS. 8 and 9) is disposed between the pair of side walls 168 and extends from the front end 162 to the rear end 164 of the bracket 114. A projection 172 upwardly extends from the top portion 166 at the rear end 164 and includes an aperture 174 for receiving the locking tang 134 of the drawer guide 110 upon insertion of the slide assembly 111 into the elongate recess 170 at the rear end 164 of the bracket 114. More specifically, and as further depicted in FIG. 7, the horizontal member 134b of the locking tang 134 fits into the aperture 174 of the projection 172 to secure and lock the drawer guide 110 to the drawer 102.

As depicted in FIG. 8, the bracket 114 may further include a pair of wings 176 disposed at a front end 178 of the projection 172. One wing 176 of the pair of wings 176 is disposed on either side of the projection 172, and each wing 176 includes an aperture 180 for receiving an attachment mechanism (not shown) to attach the bracket 114 to the rear end 106 of the drawer 102. More specifically, when securing the bracket 114 to the outside surface of the rear end 106 of the drawer 102, the wings 176 are disposed such that they are flush, e.g., in contact with, the outside surface of the rear end 106 of the drawer 102. Attachment mechanisms (not shown) are then inserted into each aperture 180 of each wing 176 to secure the bracket 114 to the outside surface of the rear end 106 of the drawer 102.

As depicted in FIG. 9, for example, each side wall 168 of the bracket 114 includes an outside surface 182 and an inside surface 184. In addition, each inside surface 184 includes a series of sloping protrusions 186 that are equally spaced from the front end 162 to the rear end 164 of the bracket 114. When slide assembly 111, in particular the drawer guide 110, is disposed within the elongate recess 170 of the bracket 114, the series of sloping protrusions 186 contact at least one side wall 126 of the drawer guide 110 to further secure the drawer guide 110 to the drawer 102. While five sloping protrusions 186a of the series of protrusions 186 are depicted in FIG. 9, one of ordinary skill in the art will appreciate that less or more than the five sloping protrusions 186a may alternatively be used and still fall within the scope of the present disclosure.

Figure 10A:
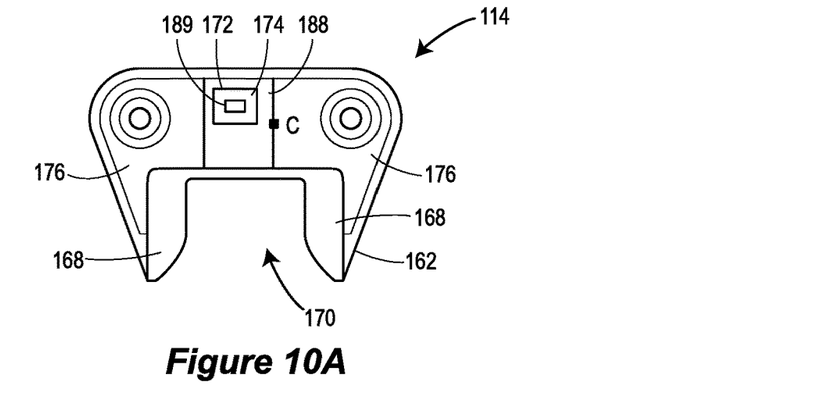
FIG. 10A is a front view of the bracket of the drawer guide system of the present disclosure.
Figure 10B:
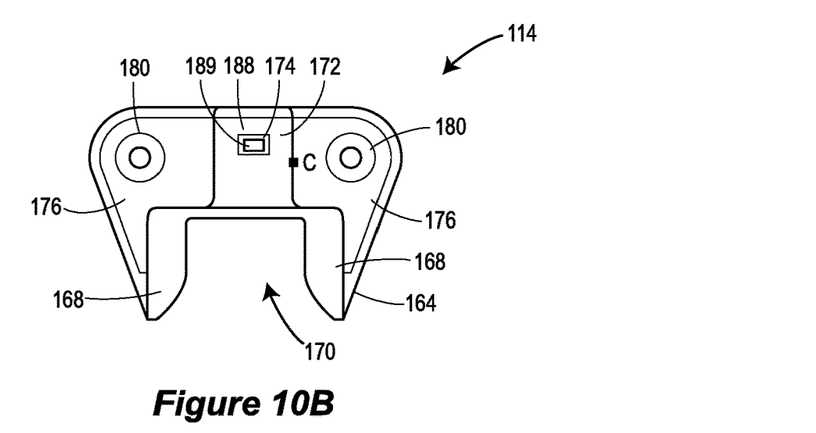
FIG. 10B is a rear view of the bracket of the drawer guide system of the present disclosure.

Referring now to FIGS. 10A and 10B, the projection 172 of the bracket 114 includes a center C, and the aperture 174 of the projection 172 is disposed in an upper section 188 of the projection 172 disposed above the center C of the projection 172. In addition, the aperture 174 extends from the front end 162 (FIG. 10A) to the rear end 164 (FIG. 10B) of the bracket 114, along the length of the bracket 114, forming a bore 189 in the projection 172.

Figure 10C:
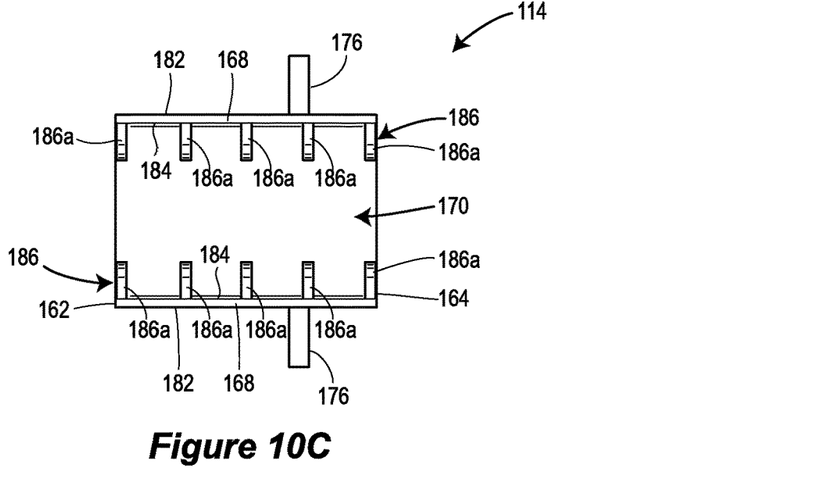
FIG. 10C is a bottom view of the bracket of the drawer guide system of the present disclosure.

As depicted in FIG. 10C, the series of sloping protrusions 186 may be disposed on both inside surfaces 184 of side walls 168 of the bracket 114. In one example, each sloping protrusion 186a disposed on one inside surface 184 of one side wall 168 may be aligned with another sloping protrusion 186a disposed on the other inside surface 184 of the other side wall 168 of the bracket 114. One of ordinary skill in the art, however, will appreciate that there may be fewer or more sloping protrusions 186a disposed on the inside surfaces 184 of the side walls 168 of the bracket 114 and/or such sloping protrusions 186a may not be aligned and still fall within the scope of the present disclosure.

Figure 11:
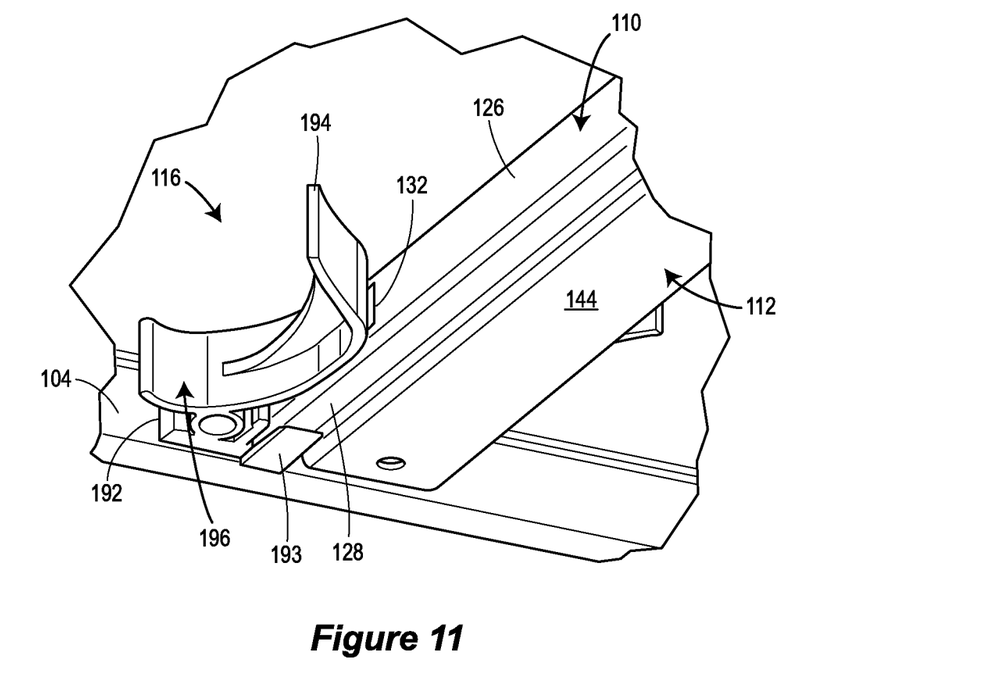
FIG. 11 is a perspective view of a release mechanism of the drawer guide system secured to the front end of the drawer.

Referring now to FIG. 11, a rear view of a release mechanism 116 secured to an inside surface of the front end 104 of the drawer 102 is depicted. The release mechanism 116 includes a front end 192, a rear end 194, and a pair of fins 196 outwardly extending from the front end 192 to the rear end 194.

Figure 12:
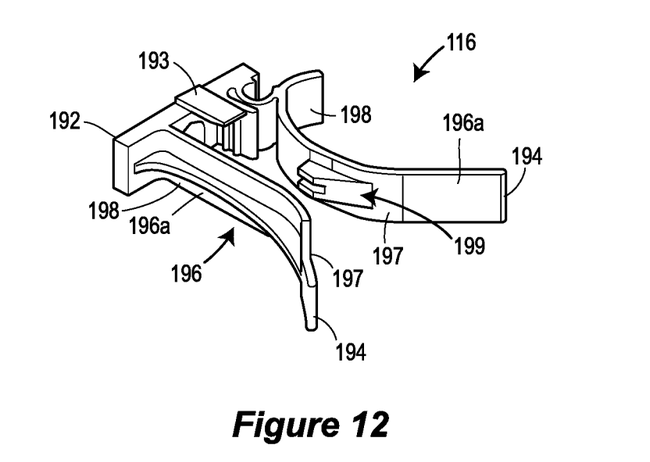
FIG. 12 is a bottom perspective view of the release mechanism of the drawer guide system of the present disclosure.
Figure 13:
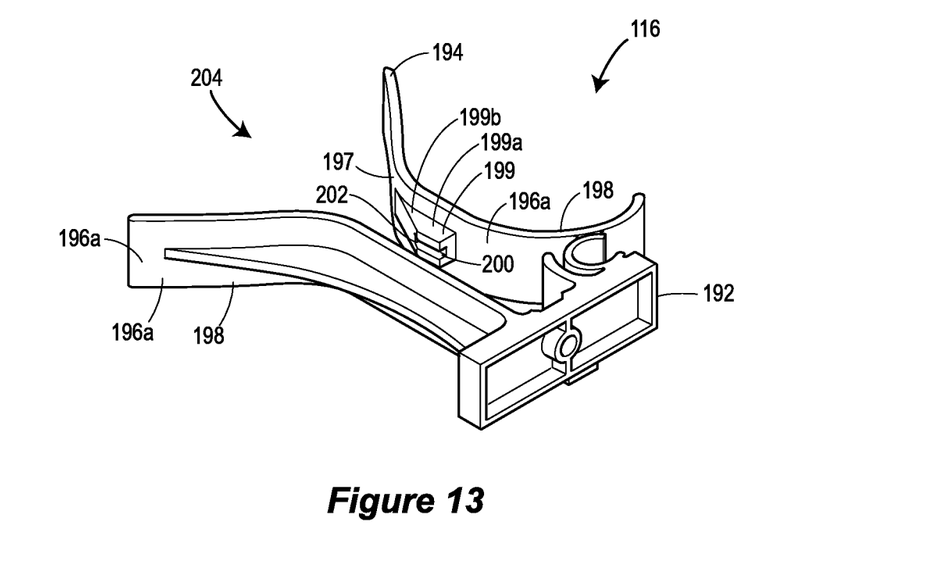
FIG. 13 is a front perspective view of the release mechanism of the drawer guide system of the present disclosure.
Figure 14:
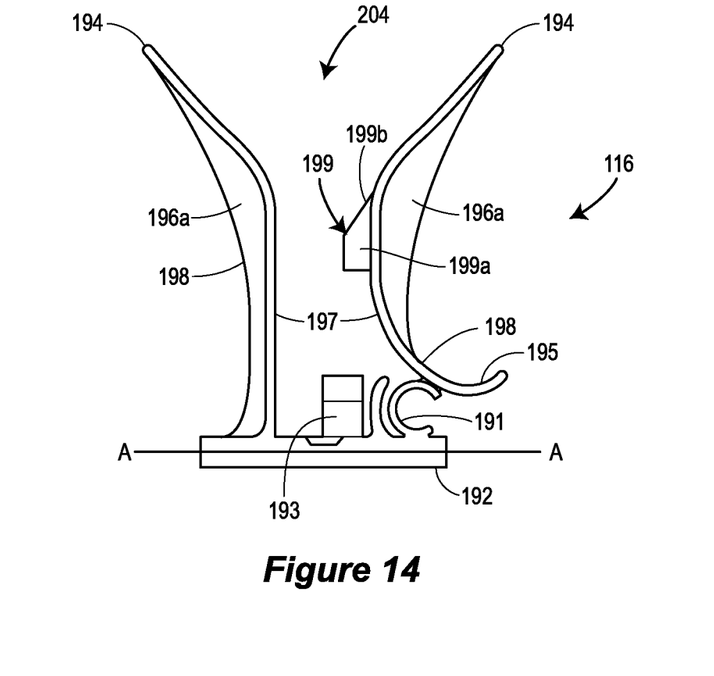
FIG. 14 is a top view of the release mechanism of the drawer guide system of the present disclosure.

As further depicted in FIGS. 12-14, each fin 196a of the pair of fins 196 of the release mechanism 116 has an inside surface 197 and an outside surface 198. A first tab 199 is disposed on the inside surface 197 of one only fin 196a of the pair of fins 196 and engages the window 132 (FIG. 5A) of the side wall 126 of the drawer guide 110 when the slide assembly 111 is disposed within the recess 170 (see, e.g., FIGS. 8 and 9) of the bracket 114 and pushed to the front end 104 of the drawer 102. The engagement between the first tab 199 of the release mechanism and the window 132 further secures the drawer guide 110 to the drawer 102.

In one example, the first tab 199 may further include a rectangular portion 199a and a sloping portion 199b (FIGS. 13 and 14). A slot 200 may be disposed within first tab 199, such as within the rectangular portion 199a of the first tab 199 to form a channel 202 within the first tab 199.

In addition, and as depicted, for example, in FIG. 12, the front end 192 of the release mechanism 116 includes a stabilizing tab 193, such as second tab 193. The second tab 193 is disposed on a bottom portion of the front end 192 and extends from the front end 192 of the release mechanism into a passageway 204. While the second tab 193 is generally depicted as rectangular in shape, one of ordinary skill in the art will appreciate that the second tab 193 may alternatively be various other shapes, such as one or more of square, circular, spherical, or triangular in shape and still fall within the scope of the present disclosure. In operation, the second tab 193 contacts and guides the inwardly extending flange 128 of the drawer guide 110 when the slide assembly 111 is disposed within the bracket 114 and the passageway 204. Thus, this contact helps stabilize the engagement between the window 132 of the drawer guide 110 and the first tab 199 of the release mechanism 116, for example.

More specifically, the passageway 204 is disposed between the inside surfaces 197 of each fin 196a of the pair of fins 196. The passageway 204 receives the front end 120 of the drawer guide 110 when the slide assembly 111 is disposed within the bracket 114. In one example, the inside surface 197 of each fin 196a of the pair of fins 196 is in contact with at least one side wall 126 of the pair of side walls 126 of the drawer guide 110 when the drawer guide 110 is disposed within the passageway 204 to guide the drawer guide 110 toward the tab 199 and the front end 104 of the drawer 102. In addition, the second tab 193 contacts a bottom surface of the inwardly extending flange 128 (FIG. 11) to both guide and align the drawer guide 110 within the passageway 204, adding stability and further engagement between the window 132 of the drawer guide 110 and the first tab 199 of the release mechanism 116.

To release the slide assembly 111, in particular the drawer guide 110 from the release mechanism 116, the outside surface 198 of the fin 196a having the first tab 199 is activated to move the first tab 199 out of the window 132 of the drawer guide 110. More specifically, and as depicted, for example, in FIG. 14, a socket 191 for receiving a hinge (not shown) is disposed between the front end 192 of the release mechanism 116 and the fin 196a having the first tab 199. The socket 191 with the hinge allows for a clockwise rotational movement of the fin 196a about the socket 191 and from a longitudinal axis A-A (FIG. 14) when an area disposed on the outside surface 198 of the fin 196a having the first tab 199 is activated by a user, e.g., pushed in a direction away from the first tab 199, for example. Said another way, to release the drawer guide 110 from the release mechanism 116, a curved surface 195 of the fin 196a is pushed in a direction away from the first tab 199, such that the curved surface 195 rotates in a clockwise direction about the socket 191. Upon activation of the curved surface 195 of the fin 196a, the first tab 199 is dislodged, e.g., disengages, from the window 132 of the drawer guide 110, allowing the drawer guide 110 to be removed from the passageway 204 and ultimately the bracket 114, if/as desired.

While the curved surface 195 is activated to disengage, e.g., release, the window 132 of the drawer guide 110 from the first tab 199 of the release mechanism 116, other surfaces and/or areas of the fin 196a having the first tab 199 of the release mechanism 116 may alternatively be activated, e.g., actuated, to effect release. For example, the end 194 of the fin 196a having the first tab 199 may alternatively be activated or moved by a user in a clockwise direction about the socket 191 and from the longitudinal axis A-A (FIG. 14), e.g., away from the first tab 199, to disengage the first tab 199 of the release mechanism 116 from the window 132 of the drawer guide 110.

Figure 15:
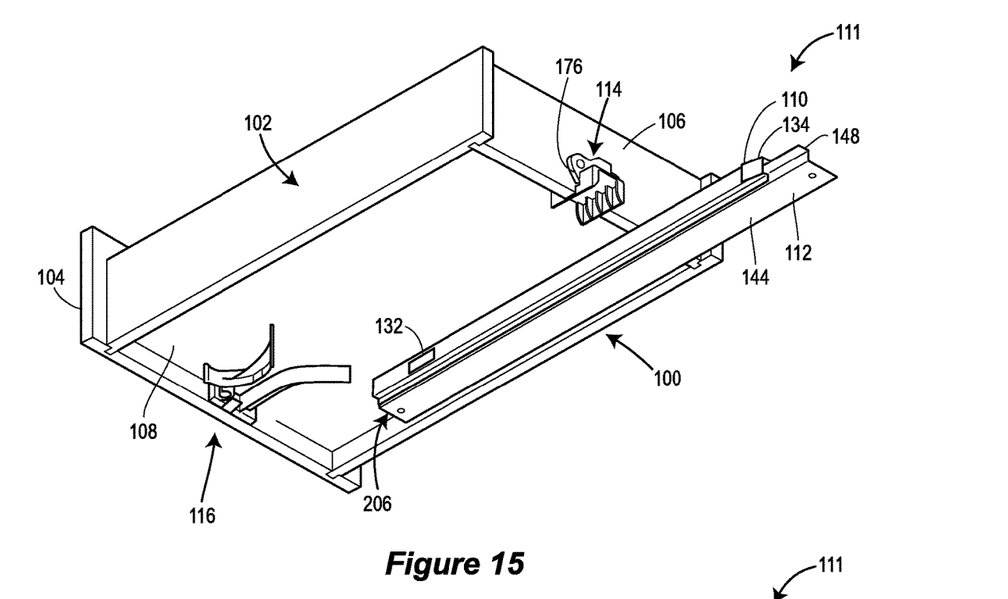
FIG. 15 is a perspective view of the drawer guide system of the present disclosure, with the case runner and drawer guide removed from the bracket and the release mechanism of the drawer guide system.
Figure 16:
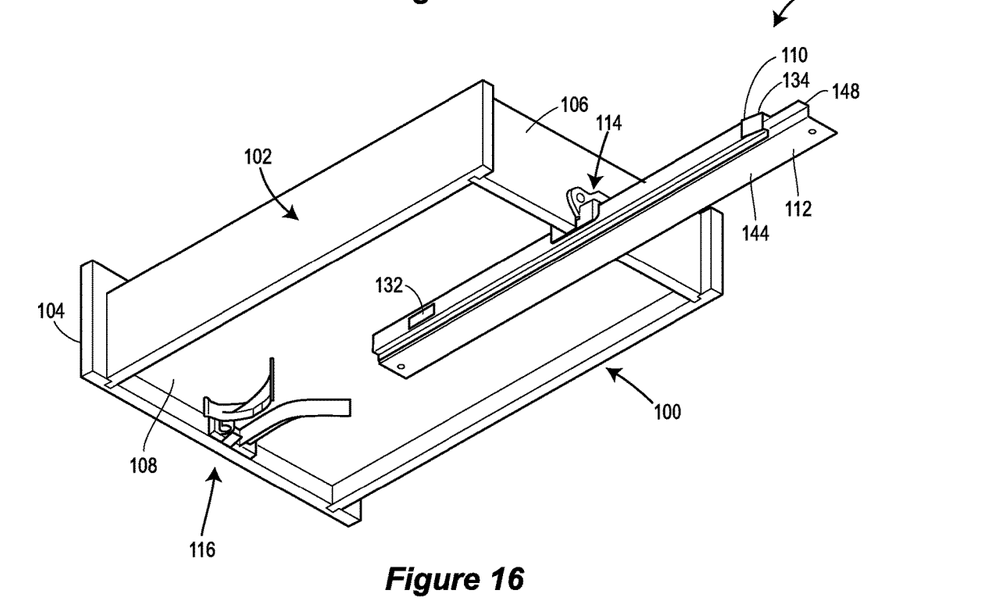
FIG. 16 is another perspective view of the drawer guide system of the present disclosure, with the case runner and the drawer guide disposed within the bracket of the drawer guide system, but not in contact with the release mechanism.

Referring now to FIGS. 15 and 16, one of ordinary skill in the art will appreciate the following method of assembling the drawer guide system 100 to the drawer 102. More specifically, the method of assembling the drawer guide system 100 to the drawer 102 includes securing the bracket 114 to a center of the outside surface of the rear end 106 of the drawer 102 and securing the release mechanism 116 to a center of the inside surface of the front end 104 of the drawer 102. The method further includes disposing the outwardly extending flange 148 within the elongate recess 130 (see, e.g., FIG. 5B) of the drawer guide 110 along the length of the drawer guide 110 to form the slide assembly 111. The method also includes inserting a front portion or a front end 206 of the slide assembly into the elongate recess 170 (FIG. 8) of the bracket 114, as depicted in FIG. 16. The slide assembly is then pushed toward the front end 104 of the drawer 102 until and the tab 199 (FIGS. 13 and 14) of the release mechanism 116 engages the window 132 of one side wall 126 of the drawer guide 110. At that time, the locking tang 134 (FIGS. 5 and 6) of the drawer guide 110 goes into the aperture 172 of the bracket 114 to lock the drawer guide 110 to the drawer 102.

In addition, and in one example, securing the release mechanism 116 to a center of an inside front portion 104 of the drawer 102 comprises aligning the center of the front end 104 of the drawer 102 with the center of the rear end 106 of the drawer 102 to which the bracket 114 is secured. The center of the front end 104 and the center of the rear end 106 of the drawer 106 are disposed along the same longitudinal axis.

Further, in yet another example, securing the bracket 114 to the center of the rear end 106 of the drawer 102 comprises positioning the pair of wings 176 disposed on the front of the projection 172 (FIG. 7) to be flush with the center of the outside surface of the rear end 106 of the drawer 102. Still further, the method may also include inserting an attachment mechanism (not shown) into at least one aperture 180 (FIG. 8) disposed in at least one wing 176 of the pair of wings 176 to secure the bracket 114 to the center of the outside surface of rear end 106 of the drawer 102.

In yet another example, disposing a portion of the case runner 112 within the elongate recess 130 of the drawer guide 110 along the length of the drawer guide 110 may include trapping the outwardly extending flange 148 (FIG. 5B) of the case runner 112 within the elongate recess 130 of the drawer guide 110 at least in part by the inwardly extending flange 128 of the case runner 112. The inwardly extending flange 128 of the drawer guide 110 is disposed below the outwardly extending flange 148 of the case runner 112 when the case runner 112 is disposed within the elongate recess 130 of the case runner 112.

Further, engaging the first tab 199 of the release mechanism 116 with the window 132 of the side wall 126 of the case runner 112 may further include contacting the inwardly extending flange 128 of the drawer guide 110 with the second tab 193 disposed on the front end 192 of the release mechanism 116 to help stabilize the engagement between the first tab 199 and the window 132 of the drawer guide 110. In another example, inserting the front portion 206 of the slide assembly 111 into the elongate recess 170 of the bracket 114 comprises contacting at least one side wall 126 of the drawer guide 110 with the series of sloping protrusions 186 (FIG. 9). In yet another example, the method may further include activating an area of the outside surface 198 of the fin 196a having the first tab 199 in a clockwise direction about the socket 191 and away from the first tab 199 to disengage the first tab 199 of the release mechanism 116 from the window 132 of the drawer guide 110.

Overall, one of ordinary skill in the art will appreciate the various advantages of the drawer guide system 100 of the present disclosure. For example, the center mounting of the drawer guide 110 and case runner 112 to the back or rear ends of the drawer 102 is unlike conventional drawer guide systems having the case runners and drawer guides mounted on both sides of the drawer, for example. See, e.g., FIG. 1. As a result, only one case runner and drawer guide assembly, e.g., the slide assembly 111, is needed to secure the drawer guide system 100 of the present disclosure to the drawer 102, as compared to two slide assemblies needed on each side of the drawer in conventional systems, making the drawer guide system 100 of the present disclosure more efficient to assemble and less expensive.

In addition, because the bracket 114 of the present disclosure is always secured first to the back or read end of the drawer 102 at a center of the rear end, and the bracket 114 includes the dedicated aperture 174 for receiving the tang 134 of the drawer guide 110, no milling of any holes in the back or rear end of the drawer 102 is needed to receive the tang 134 of the drawer guide 110. See, e.g., FIG. 1. By eliminating the need for milling the holes in the rear end of the drawer, for example, the assembly process also becomes more efficient and accurate, and, thus, less costly.

Further, having the drawer guide 110 and the case runner 112 preassembled before being inserted into the bracket 114 further increases the efficiency of the process of assembling the drawer guide system 100 of the present disclosure. In conventional systems, the case runner is typically attached to a piece of furniture and the drawer guide was secured to the drawer, for example.

While the preceding text sets forth a detailed description of numerous different embodiments of the invention, it should be understood that the legal scope of the invention is defined by the words of the claims set forth at the end of a patent claiming priority hereto. The detailed description is to be construed as exemplary only and does not describe every possible embodiment of the invention since describing every possible embodiment would be impractical, if not impossible. Numerous alternative embodiments could be implemented, using either current technology developed after the filing date of this patent, which would still fall within the scope of the claims of the patent. More generally, although certain example systems and assemblies have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A drawer guide system comprising:
    a drawer guide having a front end, a rear end, a top portion, a pair of side walls attached to the top portion, an inwardly extending flange attached to one side wall of the pair of side walls and extending from the front end to the rear end, an elongate recess disposed between the top portion and the pair of side walls, a window disposed on one side wall of the pair of side walls near the front end, and a locking tang disposed on the top portion near the rear end;
    a case runner having a front end, a rear end, a base, one side wall attached to the base and an outwardly extending flange attached to the side wall and extending from the front end to the rear end, the outwardly extending flange disposed within the elongated recess of the drawer guide along a length of the drawer guide forming a slide assembly;
    a bracket secured to a center of a rear portion of a drawer, the bracket having a front end, a rear end, a top portion, a pair of side walls attached to the top portion, an elongate recess disposed between the pair of side walls and extending from the front end to the rear end, and a projection upwardly extending from the top portion at the rear end, the projection having an aperture for receiving the locking tang of the drawer guide upon insertion of the slide assembly into the elongate recess of the bracket; and
    a release mechanism secured to a center of a front portion of the drawer, the release mechanism having a front end, a rear end, a pair of fins outwardly extending from the front end to the rear end, each fin of the pair of fins having an inside surface, a first tab disposed on an inside surface of one fin of the pair of fins and a second tab disposed on the front end;
    wherein the first tab of the release mechanism engages the window of the side wall of the drawer guide, the second tab of the release mechanism contacts the inwardly extending flange of the drawer guide, and the locking tang of the drawer guide engages the receiving aperture of the bracket to lock the drawer guide to the drawer,
    the release mechanism further comprises a curved surface of the fin having the first tab, the curved surface to be activated to move in a clockwise direction about a socket, effecting disengagement between the first tab of the release mechanism and the window of the drawer guide.

2. The drawer guide system of claim 1, where the receiving aperture of the projection of the bracket is disposed in an upper section of the projection and extends along the length of the projection, forming a bore in the projection.

3. The drawer guide system of claim 1, the projection having a front end and a rear end, and the bracket further comprising a pair of wings disposed on the front end of the projection, one wing from the pair of wings is disposed on either side of the projection, and each wing having an aperture for receiving an attachment mechanism to attach the bracket to a surface of a drawer.

4. The drawer guide system of claim 1, wherein the outwardly extending flange of the case runner is trapped within the elongate recess of the drawer guide at least in part by the inwardly extending flange of the drawer guide, the inwardly extending flange of the drawer guide disposed below the outwardly extending flange of the case runner when the case runner is disposed within the elongated recess of the drawer guide.

5. The drawer guide system of claim 1, the first tab of the release mechanism being disposed on only one inside surface of the pair of fins.

6. The drawer guide system of claim 1, the release mechanism further including a passageway disposed between the pair of fins, the passageway for receiving a front end of the drawer guide, the inside surface of each fin of the pair of fins in contact with a pair of side walls of the drawer guide when the drawer guide is disposed within the passageway.

7. A release mechanism for a drawer guide system, the release mechanism comprising:
    a front end to be secured to an inside surface of a front end of a drawer, a rear end, and a pair of fins extending from the front end to the rear end, each fin of the pair of fins having an outside surface and an inside surface;
    a first tab disposed on the inside surface of one fin, the first tab to engage a window of a drawer guide to secure the drawer guide to the front end of the drawer;
    a second tab disposed on the front end, the second tab to contact an inwardly extending flange of the drawer guide to help stabilize engagement between the first tab and the window; and
    a curved surface and a socket for receiving a hinge, the socket disposed between the curved surface and the front end, the curved surface to be activated to rotate clockwise about the socket to disengage the first tab from the window of the drawer guide.

8. The release mechanism of claim 7, wherein the first tab further includes a horizontal portion, a sloping portion, and a slot disposed within the horizontal portion, the slot forming a channel along a portion of the first tab.

9. The release mechanism of claim 7, further comprising a passageway for receiving a front end of the drawer guide, the inside surface of each fin of the pair of fins in contact with at least one wall of the pair of side walls of the drawer guide when the drawer guide is disposed within the passageway to guide the drawer guide.

10. A method of assembling a drawer guide system to a drawer, the method comprising:
    securing a bracket to a center of an outside surface of a rear end of a drawer, the bracket having a front end, a rear end, a top portion, a projection extending from the top portion at the rear end, an aperture disposed in the projection, and a recess;
    securing a release mechanism to a center of an inside surface of front end of the drawer, the release mechanism having a pair of fins extending from a rear end of the release mechanism, one fin from the pair of fins having a first tab;
    disposing a portion of a case runner within an elongate recess of a drawer guide along the length of the drawer guide, forming a slide assembly;
    inserting a front end of the slide assembly into the recess at the rear end of the bracket;
    engaging the tab of the release mechanism with a window of a side wall of the drawer guide;
    inserting a locking tang of the drawer guide into the aperture of the bracket to lock the slide assembly to the drawer; and
    activating a curved surface of the fin having the first tab to move in a clockwise direction about a socket of the release mechanism, disengaging the first tab of the release mechanism from the window of the drawer guide.

11. The method of claim 10, where securing the release mechanism to a center of the inside surface of the front end of the drawer comprises aligning the center of the inside front end of the drawer with the center of the outside rear end of the drawer to which the bracket is secured, the center of the front end and the center of the rear end of the drawer disposed along the same longitudinal axis.

12. The method of claim 10, where securing a bracket to a center of an outside surface of a rear end of a drawer comprises positioning a pair of wings disposed on the front of the projection to be flush with the center of the outside surface of the rear end of the drawer.

13. The method of claim 12, further comprising inserting an attachment mechanism into at least one aperture disposed in at least one wing of the pair of wings to secure the bracket to the center of the outside surface of the rear end of the drawer.

14. The method of claim 10, wherein disposing a portion of a case runner within an elongate recess of a drawer guide along the length of the drawer guide comprises trapping an outwardly extending flange of the case runner within the elongate recess of the drawer guide at least in part by an inwardly extending flange of the drawer guide, the inwardly extending flange of the drawer guide disposed below the outwardly extending flange of the case runner.

15. The method of claim 10, wherein engaging the first tab of the release mechanism with a window of a side wall of the drawer guide further comprises contacting an inwardly extending flange of the drawer guide with a second tab of the release mechanism to help stabilize the engagement between the first tab of the release mechanism and the window of the drawer guide.

16. The method of claim 10, wherein inserting a front portion of the slide assembly into the elongate recess of the bracket comprises contacting at least one side wall of the drawer guide with a series of sloping protrusions.

17. A drawer guide system comprising:
a drawer guide having a front end, a rear end, a top portion, a pair of side walls attached to the top portion, an inwardly extending flange attached to one side wall of the pair of side walls and extending from the front end to the rear end, an elongate recess disposed between the top portion and the pair of side walls, a window disposed on one side wall of the pair of side walls near the front end, and a locking tang disposed on the top portion near the rear end;
a case runner having a front end, a rear end, a base, one side wall attached to the base and an outwardly extending flange attached to the side wall and extending from the front end to the rear end, the outwardly extending flange disposed within the elongated recess of the drawer guide along a length of the drawer guide forming a slide assembly;
a bracket secured to a center of a rear portion of a drawer, the bracket having a front end, a rear end, a top portion, a pair of side walls attached to the top portion, an elongate recess disposed between the pair of side walls and extending from the front end to the rear end, and a projection upwardly extending from the top portion at the rear end, the projection having an aperture for receiving the locking tang of the drawer guide upon insertion of the slide assembly into the elongate recess of the bracket; and
a release mechanism secured to a center of a front portion of the drawer, the release mechanism having a front end, a rear end, a pair of fins outwardly extending from the front end to the rear end, each fin of the pair of fins having an inside surface, a first tab disposed on an inside surface of one fin of the pair of fins and a second tab disposed on the front end;
wherein the first tab of the release mechanism engages the window of the side wall of the drawer guide, the second tab of the release mechanism contacts the inwardly extending flange of the drawer guide, and the locking tang of the drawer guide engages the receiving aperture of the bracket to lock the drawer guide to the drawer; and
each side wall of the pair of side walls of the bracket includes an inside surface, each inside surface having a series of sloping protrusions equally spaced from the front end to the rear end of the bracket, the series of sloping protrusions to contact at least one side wall of the drawer guide when the drawer guide is disposed within the elongate recess of the bracket.

* * * * *

UNITED STATES PATENT AND TRADEMARK OFFICE
CERTIFICATE OF CORRECTION

PATENT NO. : 10,240,632 B2
APPLICATION NO. : 15/226618
DATED : March 26, 2019
INVENTOR(S) : Robert A. Moris

Page 1 of 1

It is certified that error appears in the above-identified patent and that said Letters Patent is hereby corrected as shown below:

On the Title Page

Item [73], "Wheeling, IN (US)" should read -- Wheeling, IL (US) --.

Signed and Sealed this
Twenty-fourth Day of September, 2019

Andrei Iancu
*Director of the United States Patent and Trademark Office*